No. 881,877. PATENTED MAR. 10, 1908.
P. VON WOUWERMANS.
BUNSEN BURNER.
APPLICATION FILED MAY 10, 1906.
2 SHEETS—SHEET 1.
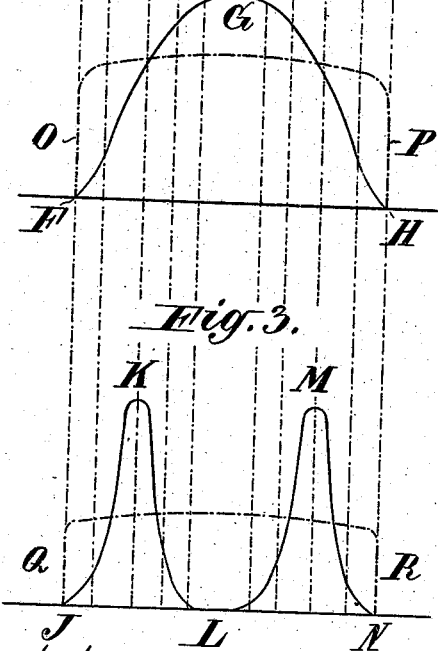
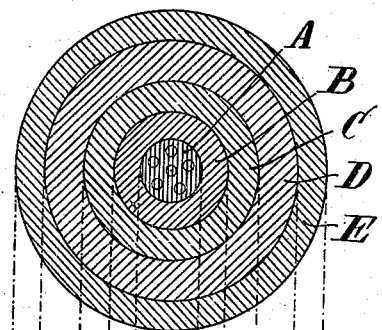
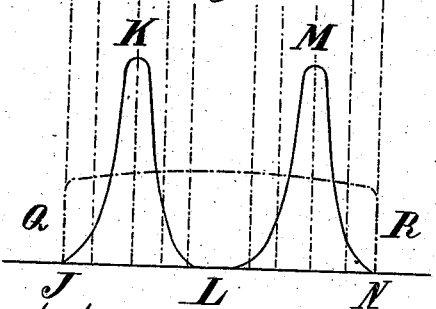
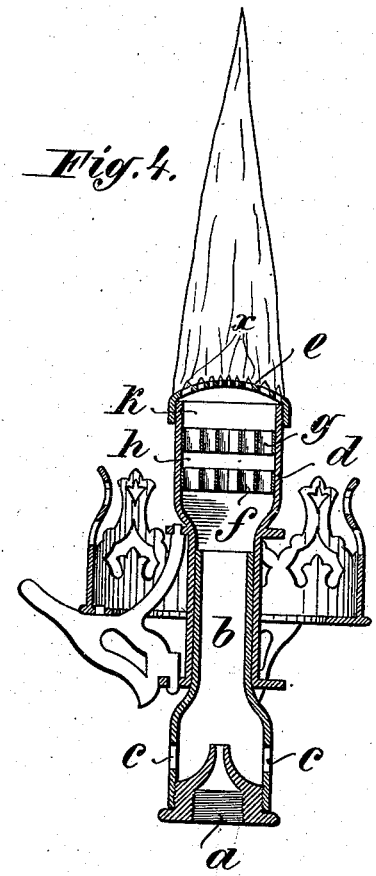
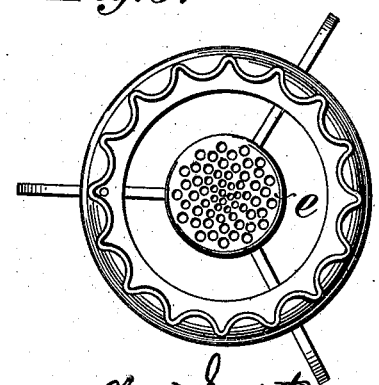

No. 881,877.　　　　　　　　　　　　PATENTED MAR. 10, 1908.
P. VON WOUWERMANS.
BUNSEN BURNER.
APPLICATION FILED MAY 10, 1906.

2 SHEETS—SHEET 2.

UNITED STATES PATENT OFFICE.

PHILIPP VON WOUWERMANS, OF VIENNA, AUSTRIA-HUNGARY, ASSIGNOR TO LUDWIG LOEWENSTEIN, OF VIENNA, AUSTRIA-HUNGARY.

BUNSEN BURNER.

No. 881,877.    Specification of Letters Patent.    Patented March 10, 1908.

Application filed May 10, 1906. Serial No. 316,221.

*To all whom it may concern:*

Be it known that I, PHILIPP VON WOUWERMANS, of Vienna, a subject of the Emperor of Austria-Hungary, and whose post-office address is No. 33 Alserbach-strasse, Vienna, Austria-Hungary, have invented a new and useful Bunsen Burner, of which the following is a specification.

This invention relates to Bunsen burners for incandescent gas lighting and heating purposes and particularly for high pressure incandescent gas lighting although it is applicable to ordinary atmospheric incandescent burners, and it has for its object the hereinafter described construction and organization of the burner head whereby a Bunsen burner is enabled to produce an elongated flame having a narrow green zone and in which the hottest temperature is generated in the exterior zone.

Figure 6:
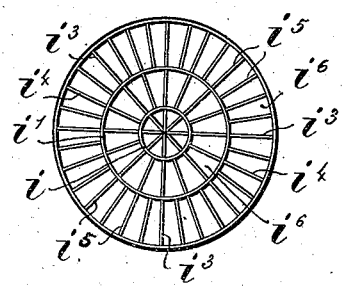
Figure 7:
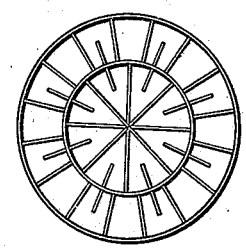
Figure 8:
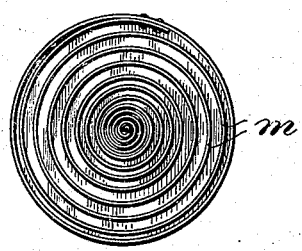
Figure 10:
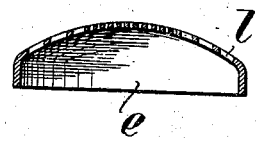
Figure 9:
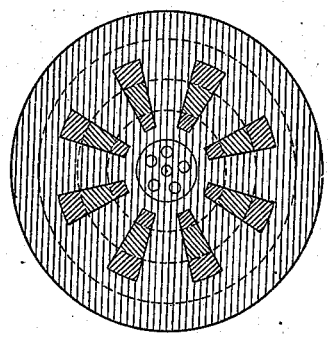
Figure 11:
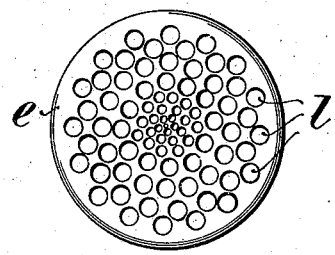

In the accompanying drawings, Figure 1 is a diagram illustrating the distribution of the gas and air in the mixing tube of an ordinary Bunsen burner, Fig. 2 is a diagram indicating the outflow velocities and Fig. 3 a diagram of the explosion velocities. Fig. 4 is a vertical section of a Bunsen burner illustrating one constructional form of the invention. Fig. 5 being a plan of the same. Figs. 6 to 8 are plans illustrating various modifications of the distributer. Fig. 9 is a diagram illustrating the effect of the distributer. Figs. 10 and 11 are respectively a sectional elevation and plan of the burner cap.

In a Bunsen burner the gas enters the mixing tube through a centrally arranged nozzle and simultaneously air is forced or drawn in through side apertures provided in the mixing tube below the plane of the outlet opening of the nozzle. The result of this arrangement is a very imperfect mixture of the air and gas which may be indicated by the diagram Fig. 1. The by far larger portion of the gas jet, by virtue of the velocity of the latter, forms a core A which is mixed with only a very slight proportion of air, and moves at the highest relative velocity; around this core A a succession of zones B, C, D are formed the proportion of gas in which, and the relative velocity of flow of which, decrease outwardly towards an external zone E which is very poor in gas and has a very low velocity. The curve F G H (Fig. 2) indicates the relative velocities of flow of the zones A, B C D and E, and the curve J K L M N (Fig. 3) the explosion velocities. From these diagrams it will be seen that the velocity of flow is greatest where there is the least proportion of air, and the explosion velocity is greatest in a zone which is approximately the mean zone of the outlet cross section and where the velocity of flow falls below the explosion velocity. From these conditions it results that the ordinary Bunsen burner produces a flame which has a high tendency to flash back, that is, to ignite at the gas nozzle, and which, moreover, is of a bulb-shaped form with a green core of considerable comparative volume. Now the shorter the green core and the more elongated the flame the hotter is the Bunsen flame.

As before stated, the object of the present invention is to produce a flame of such elongated form in which the zone of highest temperature is situated as near as possible to the exterior of the flame. For this purpose it is necessary first to produce a homogeneous mixture of air and gas, having a uniform velocity of flow, in all of its parts, and secondly to provide for an increased supply of such mixture to the outer zone of the flame.

In order to secure the above stated conditions the present invention essentially consists in subdividing the cross sectional area of the burner head by means of a kind of grating hereinafter called the "distributer", into a number of vertical small passages of relatively increasing width or area from the center outwards, and in combining with such special subdivision of the burner head a perforated cap for the latter the perforations of which cap are also of increasing width or area from the center outwards.

The arrangement within the burner head of small vertical passages of relatively increasing width from the center outwards has the effect that a large proportion of the gas is deflected from the central portion of the burner head to the sides thereof and that the velocity of flow in the central portion of the head is decreased; thus establishing conditions from which a homogeneous mixture results as hereinafter more fully described. The arrangement of a perforated cap the perforations of which are of increasing width from the center outwards has the effect of so controlling the outflow of the homogeneous mixture that a larger proportion thereof is caused to escape through the outer rows of its perforations than through the inner ones. Further as the small channels or passages are very short or shallow the friction on the walls of the same is very slight and the liability to flashing back, due to the presence of a hot body in the burner head, is reduced to a minimum.

A burner according to the invention burns with an elongated pointed flame as shown in Fig. 4, the green core of which is reduced to a narrow zone $x$ and the outflow and explosion velocities of which may be indicated by curves O P (Fig. 2) and Q R (Fig. 3).

Several distributing gratings or distributers may be fitted in the burner head separated by a small space or chamber. In the burner shown in Fig. 4, for instance two distributers, $f$, $g$ are arranged in the expanded head $d$, of the burner which is covered with a perforated cap, $e$; $a$, being the gas nozzle and $b$ the mixing tube with the air inlets $c$. The distributers $f$, $g$, are of the form shown in plan in Fig. 6, that is a kind of grating formed of concentric rings or walls, $i$, $i'$, dividing the tube into three zones, main radial divisions or walls $i^3$, which divide the zones into sectors, and secondary and tertiary radial walls $i^4$, $i^5$, which divide the sectors into still smaller passages. A number of small passages $i^6$ are thus formed of increasing area from the center outwards.

The crude mixture of gas and air obtained by the distribution of the gas from the center of the tube outwards is subsequently transformed in an intimate mixture by the whirling motion imparted to the small currents of crude mixture while flowing through the passages of the distributer and the fact that the individual whirls in issuing from said passages into the chamber $h$ rapidly spread out in the latter and thereby intermix with each other. By a repetition of these actions due to the next distributer $g$ and the chamber $k$, the latter is filled with a very homogeneous mixture. Fig. 9 is a diagram illustrating the action of the distributers, the vertical shading indicating the resulting homogeneous mixture.

The cap, $d$, as shown in Figs. 4, 10 and 11 is perforated with holes of increasing width or area towards the circumference so that more mixture escapes in the outer zone resulting in a flame which is hottest in its outer zone or that next to the incandescent mantle.

Obviously the construction of the distributers may be varied but is not limited to the one shown in Figs. 4 and 6. Fig. 7 shows in plan a modification of the construction shown in Fig. 6. Fig. 8 shows a construction wherein the passages are formed by means of a piece of metal bent into a spiral form. Two such spiral distributers may be used arranged with spirals of different hand. The distributers may also be composed of juxtaposed small pipes of circular, elliptical, or polygonal cross section, the invention not being confined to any spcial form so long as the areas of the distributing passages increase from the center outwards.

I am aware that it is old to subdivide the head of a Bunsen burner into a number of small passages of equal width, as also a burner cap having perforations of equal width both for the purpose of preventing flashing back of the flame. I therefore do not broadly claim the combination of the burner head with a subdividing system of channels arranged therein and with a perforated cap but

What I claim as my invention is:

1. In a Bunsen burner the combination with the gas-nozzle and the mixing tube provided with air inlets of an enlarged burner head containing a distributer subdivided into small vertical passages the width of which increases from the center outwards, and a perforated cap on the burner head the perforations in which cap are of increasing width from the center outward, substantially as and for the purposes specified.

2. In a Bunsen burner, the combination with the gas-nozzle and the mixing tube provided with air inlets, of an enlarged burner head containing a distributing diaphragm arranged at some distance above the mouth of the mixing tube and formed with small vertical passages near the center surrounded toward the outside with vertical passages of larger area, and a cap having perforations of larger area near the outside and smaller area near the center, covering the burner head at a distance above said distributer so as to provide an intervening mixing chamber, substantially as described.

3. In a Bunsen burner the combination with the usual gas-nozzle and a mixing tube provided with air inlets, of an enlarged burner head, a plurality of distributers spaced apart within the same, each formed with concentric rows of vertical passages, the perforations of the outer circle being of larger area than those of the inner, and a perforated cap covering the top of the burner head some distance above the upper distributer, the perforations near the periphery of said cap being of larger area than those near the center, substantially as described.

In testimony whereof I have hereunto set my hand in presence of two subscribing witnesses.

PHILIPP VON WOUWERMANS.

Witnesses:
HEINRICH HOERMAN,
ALVESTO S. HOGUE.